US012136401B2

(12) United States Patent
Fu et al.

(10) Patent No.: US 12,136,401 B2
(45) Date of Patent: Nov. 5, 2024

(54) DISPLAY DEVICE WITH DRIVING INTERGRATED CIRCUIT AND ELECTRONIC DEVICE

(71) Applicant: TCL CHINA STAR OPTOELECTRONICS TECHNOLOGY CO., LTD., Shenzhen (CN)

(72) Inventors: Xinbo Fu, Shenzhen (CN); Ruoqiao Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/427,604

(22) PCT Filed: May 20, 2021

(86) PCT No.: PCT/CN2021/094750

§ 371 (c)(1),
(2) Date: Jul. 30, 2021

(87) PCT Pub. No.: WO2022/236859

PCT Pub. Date: Nov. 17, 2022

(65) Prior Publication Data

US 2024/0038189 A1 Feb. 1, 2024

(30) Foreign Application Priority Data

May 11, 2021 (CN) ........................ 202110510463.2

(51) Int. Cl.
*G09G 3/36* (2006.01)

(52) U.S. Cl.
CPC ... *G09G 3/3611* (2013.01); *G09G 2320/0233* (2013.01); *G09G 2320/028* (2013.01); *G09G 2330/021* (2013.01)

(58) Field of Classification Search
CPC .................................................. G09G 3/3611
See application file for complete search history.

(56) References Cited

U.S. PATENT DOCUMENTS

2001/0043303 A1 11/2001 Shibahara et al.
2007/0030231 A1* 2/2007 Lee ...................... G09G 3/3655 345/94

(Continued)

FOREIGN PATENT DOCUMENTS

CN 201122422 Y 9/2008
CN 101794560 A 8/2010

(Continued)

*Primary Examiner* — Matthew Yeung
*Assistant Examiner* — Andrew B Schnirel
(74) *Attorney, Agent, or Firm* — PV IP PC; Wei Te Chung

(57) ABSTRACT

The present application discloses a display device and an electronic device. The display device includes a liquid crystal display panel and a driving integrated circuit. An output end of the driving integrated circuit is electrically connected to shared thin-film transistors of subpixels having a same color. By supplying different powers to the shared thin-film transistors of the subpixels having different colors through different output ends of the driving integrated circuit, a power of a load carried by a same power supply loop can be reduced, thereby increasing a uniformity of displayed brightness.

12 Claims, 4 Drawing Sheets

(56) References Cited

U.S. PATENT DOCUMENTS

| | | | | |
|---|---|---|---|---|
| 2008/0291190 | A1* | 11/2008 | Kim | G09G 3/3648 345/211 |
| 2015/0042631 | A1* | 2/2015 | Kim | G09G 3/3655 345/212 |
| 2015/0339968 | A1* | 11/2015 | Yoshioka | G02F 1/133621 345/89 |
| 2016/0246089 | A1* | 8/2016 | Jeong | H01L 27/124 |
| 2019/0392761 | A1* | 12/2019 | Huang | G09G 3/3258 |
| 2021/0118384 | A1* | 4/2021 | Liu | G02F 1/136286 |

FOREIGN PATENT DOCUMENTS

| | | | |
|---|---|---|---|
| CN | 101872595 | A | 10/2010 |
| CN | 202889289 | U | 4/2013 |
| CN | 104991362 | A | 10/2015 |
| CN | 108922467 | A | 11/2018 |
| CN | 109061967 | A | 12/2018 |
| CN | 110570825 | A | 12/2019 |
| JP | 2010256401 | A | 11/2010 |
| KR | 20160013400 | A | 2/2016 |

* cited by examiner

DISPLAY DEVICE WITH DRIVING INTERGRATED CIRCUIT AND ELECTRONIC DEVICE

RELATED APPLICATIONS

This application is a Notional Phase of PCT Patent Application No. PCT/CN2021/094750 having international filing date of May 20, 2021, which claims the benefit of priority of Chinese Patent Application No. 202110510463.2 filed on May 11, 2021. The contents of the above applications are all incorporated by reference as if fully set forth herein in their entirety.

FIELD OF INVENTION

The present application is related to the field of display technology and specifically to a display device and an electronic device.

BACKGROUND OF INVENTION

A liquid crystal display device can include a plurality of subpixels. A display region corresponding to each of the subpixels can be divided into a major display region and a minor display region. Each of the subpixels can include at least one pixel driving circuit. The pixel driving circuit includes a shared thin-film transistor. One of a source or a drain of the shared thin-film transistor is connected to a pixel electrode in the minor display region. The other one of the source or the drain of the shared thin-film transistor is connected to a shared bar (SB).

Correspondingly, an output end of an external power supply loop is electrically connected to all the shared bars in the liquid crystal display device to provide a corresponding driving signal. However, because a transmission of the driving signal is prone to voltage drop, and the driving signal for all the shared bars is provided by the same power supply loop, a current upper limit that the power supply loop can provide is limited, which is not enough to meet power supply requirements of all the shared bars. This can easily lead to a poor display phenomenon such as uneven brightness and viewing angle deviation.

It should be noted that the above introduction of background technology is only for a convenience of a clear and complete understanding of technical solutions of the present application. Therefore, the above involved technical solutions cannot be considered known to those skilled in the art merely because they are described in the background of the present application.

SUMMARY OF INVENTION

The present application provides a display device and an electronic device to relieve a technical problem of a poor display caused by all shared thin-film transistors powered by a same electrical signal.

In a first aspect, the present application provides a display device including a liquid crystal display panel and a driving integrated circuit. The liquid crystal display panel includes subpixels having a plurality of colors. Each of the subpixels includes a shared thin-film transistor. An output end of the driving integrated circuit is electrically connected to the shared thin-film transistors of the subpixels having a same color, and the output end of the driving integrated circuit is electrically connected to one of a source or a drain of the shared thin-film transistor.

In an embodiment, the driving integrated circuit includes a plurality of driving circuits. An output end of each of the driving circuits is electrically connected to the shared thin-film transistors of the subpixels having the same color.

In an embodiment, each of the driving circuits includes a current amplifier and a follower amplifier. An inverting input end of the current amplifier is connected to an output end of the current amplifier. A non-inverting input end of the follower amplifier is connected to the output end of the current amplifier. An inverting input end of the follower amplifier is connected to an output end of the follower amplifier and one of the source or the drain of the shared thin-film transistor.

In an embodiment, each of the driving circuits further includes a digital-to-analog converter. An output end of the digital-to-analog converter is connected to a positive input end of the current amplifier.

In an embodiment, a power end of the current amplifier and a power end of the follower amplifier are configured to connect to a positive power signal. A voltage reference end of the digital-to-analog converter is configured to connect to a reference voltage signal. An electric potential of the reference voltage signal is less than an electric potential of the positive power signal.

In an embodiment, the electric potential of the positive power signal ranges from 15 volt (V) direct current to 18 V direct current. A difference between the electric potential of the positive power signal and the electric potential of the reference voltage signal ranges from 0.3 V to 0.7 V.

In an embodiment, the difference between the electric potential of the positive power signal and the electric potential of the reference voltage signal is 0.5 V.

In an embodiment, the driving integrated circuit further includes a timing controller, a memory, and a bidirectional two-wire synchronous serial bus controller. An output end of the timing controller is connected to an input end of the digital-to-analog converter. The memory is connected to the timing controller and is configured to store an output voltage parameter of the digital-to-analog converter. The bidirectional two-wire synchronous serial bus controller is connected to the timing controller and is configured to online adjust an output voltage of the digital-to-analog converter or write the output voltage parameter to the memory.

In an embodiment, the display device further includes a plurality of data lines and a plurality of scan lines. Each of the data lines is electrically connected to a column of the subpixels. Each of the scan lines is electrically connected to a row of the subpixels.

In a second aspect, the present application provides an electronic device including the display device in any of the above embodiments.

The display device and the electronic device provided by the present application can reduce a power of a load carried by a same power supply loop by supplying different powers to the shared thin-film transistors of the subpixels having different colors through different output ends of the driving integrated circuit. This meets power supply requirements of different thin-film transistors and increases a driving capability of the shared thin-film transistors, thereby increasing a uniformity of displayed brightness. Meanwhile, the subpixels having different colors are driven by different power supply loops, which helps to relieve a color shift caused by viewing angle deviation, thereby increasing an optimization effect of different viewing angles.

DETAILED DESCRIPTION OF EMBODIMENTS

In order to make purposes, technical solutions, and effects of the present application clearer and more specific, the present application is further described in detail below with reference to the accompanying drawings and examples. It should be understood that the specific embodiments described herein are only used to explain the present application, and are not used to limit the present application.

Figure 1:
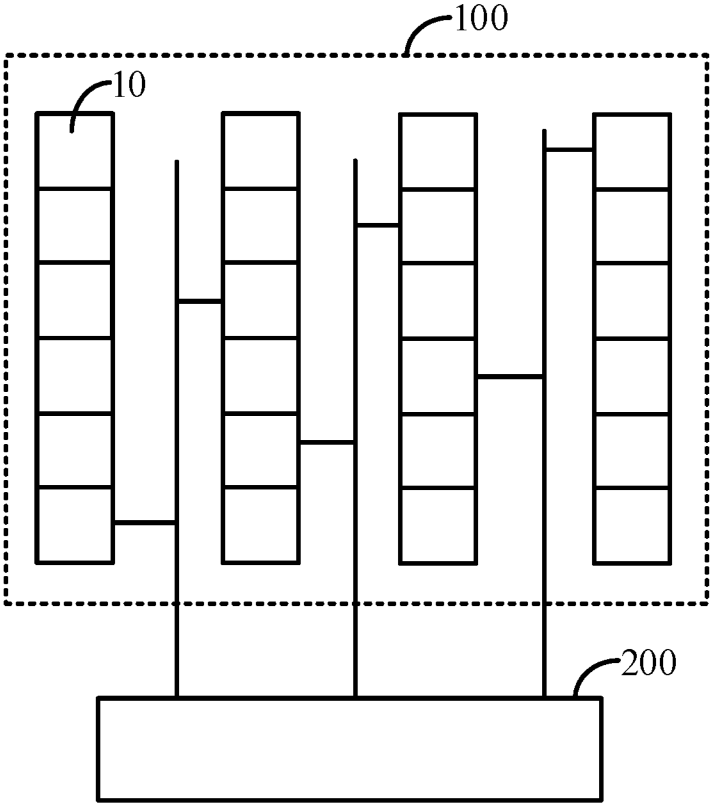
FIG. 1 is a structural diagram of a display device provided by an embodiment of the present application.
Figure 2:
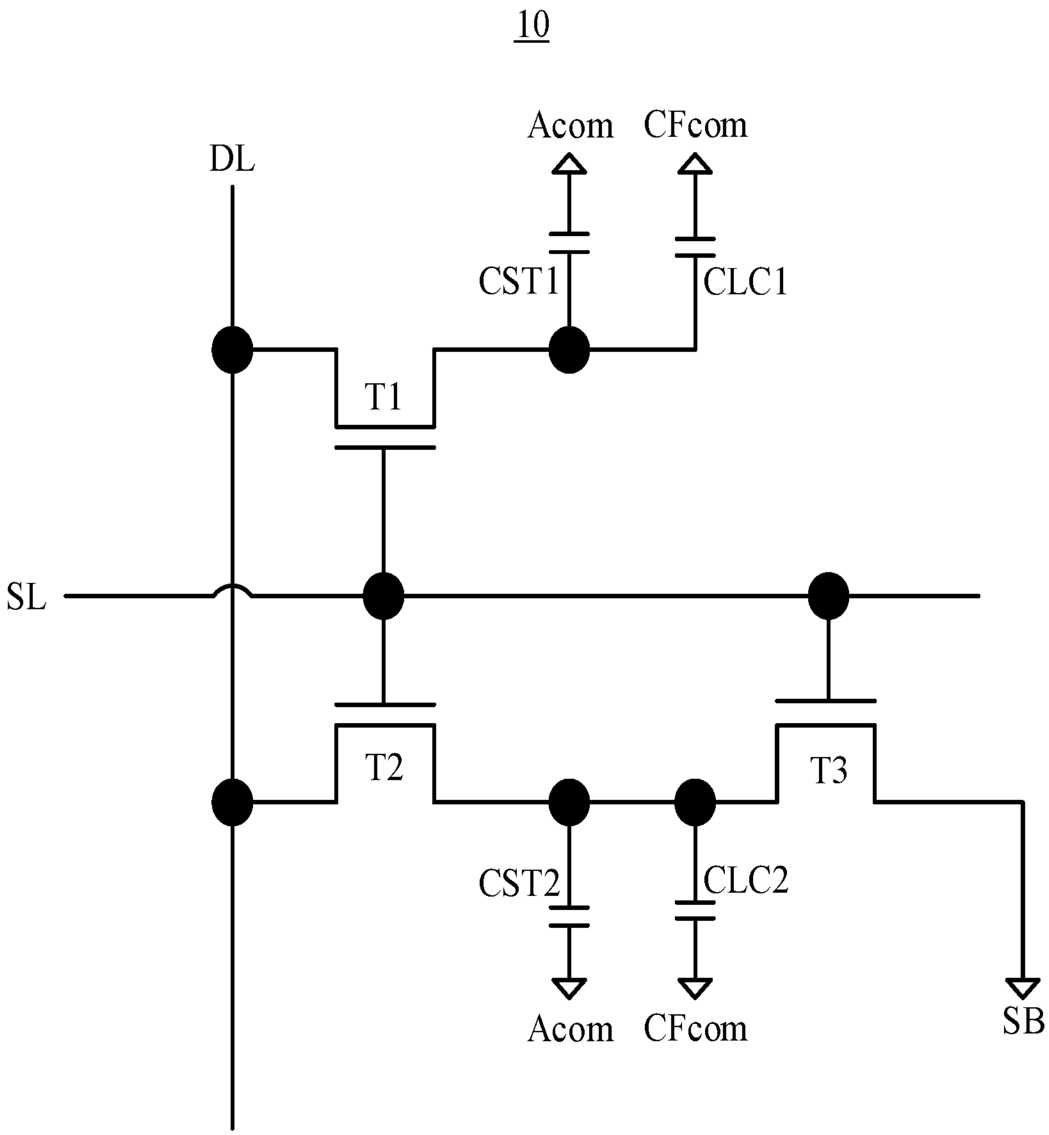
FIG. 2 is a structural diagram of a pixel driving circuit provided by an embodiment of the present application.
Figure 3:
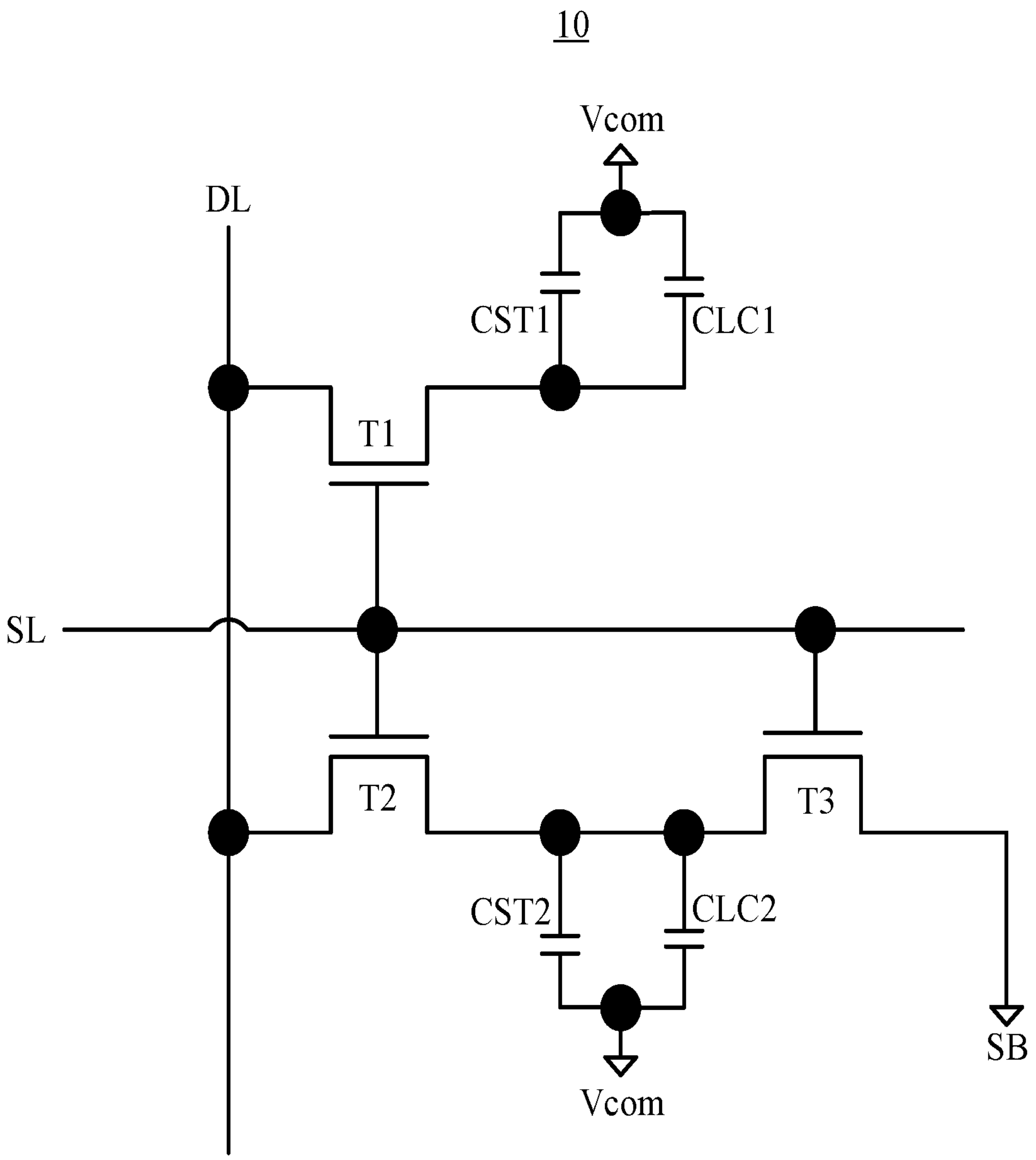
FIG. 3 is another structural diagram of the pixel driving circuit provided by an embodiment of the present application.

Please refer to FIGS. 1-4. As shown in FIGS. 1-3, this embodiment provides a display device including a liquid crystal display panel 100 and a driving integrated circuit 200. The liquid crystal display panel 100 includes subpixels 10 having a plurality of colors. Each of the subpixels 10 includes a shared thin-film transistor T3. An output end of the driving integrated circuit 200 is electrically connected to the shared thin-film transistors T3 of the subpixels 10 having a same color. The output end of the driving integrated circuit is electrically connected to one of a source or a drain of the shared thin-film transistor T3.

It can be understood that the display device provided by this embodiment can reduce a power of a load carried by a same power supply loop by supplying different powers to the shared thin-film transistors T3 of the subpixels 10 having different colors through different output ends of the driving integrated circuit 200. This meets power supply requirements of different thin-film transistors and increases a driving capability of the shared thin-film transistors T3, thereby increasing a uniformity of displayed brightness. Meanwhile, the subpixels 10 having different colors are driven by different power supply loops, which helps to relieve a color shift caused by viewing angle deviation, thereby increasing an optimization effect of different viewing angles.

It should be noted that, in this embodiment, the driving integrated circuit 200 is integrated in a form of an integrated circuit, which can be highly integrated and is beneficial to reduce its occupied space. Meanwhile, this reduces a usage number of discrete components and can also reduce material costs of printed circuit boards.

It can be understood that the display device can further include a plurality of data lines DL and a plurality of scan lines SL. A data line DL is electrically connected to a column of the subpixels 10. A scan line SL is electrically connected to a row of the subpixels 10.

It should be explained that, in this embodiment, as shown in FIG. 2, the subpixels 10 can include a pixel driving circuit. The pixel driving circuit can include a major thin-film transistor T1, a minor thin-film transistor T2, a shared thin-film transistor T3, a major storage capacitor CST1, a major liquid crystal capacitor CLC1, a minor storage capacitor CST2, and a minor liquid crystal capacitor CLC2. The data line DL is electrically connected to one of a source or a drain of the major thin-film transistor T1 and one of a source or a drain of the minor thin-film transistor T2. The scan line SL is electrically connected to a gate of the major thin-film transistor T1, a gate of the minor thin-film transistor T2, and a gate of the shared thin-film transistor T3. The other one of the source or the drain of the major thin-film transistor T1 is electrically connected to one end of the major storage capacitor CST1 and one end of the major liquid crystal capacitor CLC1. The first common electrode Acom is electrically connected to the other end of the major storage capacitor CST1. The second common electrode CFcom is electrically connected to the other end of the major liquid crystal capacitor CLC1. The other one of the source or the drain of the minor thin-film transistor T2 is electrically connected to one end of the minor storage capacitor CST2, one end of the minor liquid crystal capacitor CLC2, and one of the source or the drain of the shared thin-film transistor T3. The first common electrode Acom is electrically connected to the other end of the minor storage capacitor CST2. The second common electrode CFcom is electrically connected to the other end of the minor liquid crystal capacitor CLC2. The other one of the source or the drain of the shared thin-film transistor T3 is electrically connected to the output end of the driving integrated circuit 200 through a shared bar SB.

The first common electrode Acom can be disposed on an array substrate of the display device. The second common electrode CFcom can be disposed on a color filter substrate of the display device.

In another embodiment, as shown in FIG. 3, the pixel driving circuit can include a major thin-film transistor T1, a minor thin-film transistor T2, a shared thin-film transistor T3, a major storage capacitor CST1, a major liquid crystal capacitor CLC1, a minor storage capacitor CST2, and a minor liquid crystal capacitor CLC2. The data line DL is electrically connected to one of a source or a drain of the major thin-film transistor T1 and one of a source or a drain of the minor thin-film transistor T2. The scan line SL is electrically connected to a gate of the major thin-film transistor T1, a gate of the minor thin-film transistor T2, and a gate of the shared thin-film transistor T3. The other one of the source or the drain of the major thin-film transistor T1 is electrically connected to one end of the major storage capacitor CST1 and one end of the major liquid crystal capacitor CLC1. The other one of the source or the drain of the minor thin-film transistor T2 is electrically connected to one end of the minor storage capacitor CST2, one end of the minor liquid crystal capacitor CLC2, and one of the source or the drain of the shared thin-film transistor T3. A third common electrode Vcom is electrically connected to the other end of the major storage capacitor CST1, the other end of the major liquid crystal capacitor CLC1, the other end of the minor storage capacitor CST2, and the other end of the minor liquid crystal capacitor CLC2. The other one of the source or the drain of the shared thin-film transistor T3 is electrically connected to the output end of the driving integrated circuit 200 through a shared bar SB.

It should be explained that one of the source or the drain of the shared thin-film transistor T3 can further be directly configured as the shared bar SB, and one of the source or the drain of the shared thin-film transistor T3 can further be directly electrically connected to the output end of the driving integrated circuit 200.

In this embodiment, the third common electrode Vcom can be, but is not limited to the first common electrode Acom, and the third common electrode Vcom can also be the second common electrode CFcom.

In an embodiment, at least one of the major thin-film transistor T1, the minor thin-film transistor T2, or the shared thin-film transistor T3 can be an amorphous silicon thin-film transistor. Due to a low electron mobility of the amorphous silicon thin-film transistor, its on-resistance is large, and its load current is small. For example, the load current is usually less than 50 mA, which greatly affects a driving ability of the shared bar SB. However, after adopting relevant embodiments of the present application, the driving ability of driving circuits on the shared bar SB can be effectively increased.

In an embodiment, at least one of the major thin-film transistor T1, the minor thin-film transistor T2, or the shared thin-film transistor T3 can be an indium gallium zinc oxide thin-film transistor. Due to a lower electron mobility of the indium gallium zinc oxide thin-film transistor, its on-resistance is larger, and its load current is smaller. For example, the load current can reach 300 mA. On this basis, after adopting relevant embodiments of the present application, the driving ability of the driving circuits on the shared bar SB can be further increased.

It can be understood that the electron mobility of the indium gallium zinc oxide thin-film transistor is 20-30 times of the electron mobility of the amorphous silicon thin-film transistor. This can greatly increase a charging and discharging rate of the shared thin-film transistor T3 to the pixel electrode, while achieving a lower energy consumption. Therefore, the indium gallium zinc oxide thin-film transistor, as the shared thin-film transistor T3, is more suitable for large-size (85 inches and above), high-resolution (8K and 4K), and high-refresh rate (120 Hz and above) LCD products, and is also conducive to achieving better product benefits.

In a large-size and high-resolution liquid crystal display product, viewing angles are an important consideration for an image quality. In an embodiment, the liquid crystal display panel 100 can be a liquid crystal display product having an 8K resolution and adopting the indium gallium zinc oxide thin-film transistors. The liquid crystal display product can adopt an eight-domain display mode and introduce the shared bar SB with adjustable voltage, which can achieve a better viewing angle effect compared with a similar four-domain display product.

Figure 4:
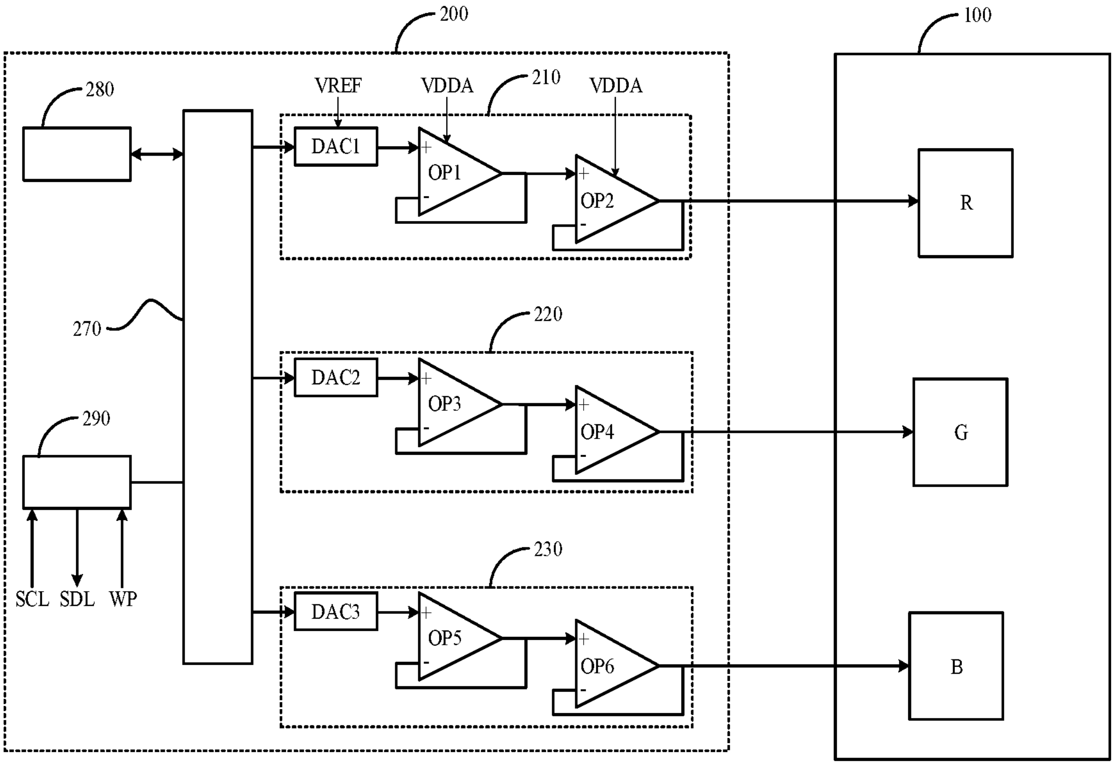
FIG. 4 is another structural diagram of the display device provided by an embodiment of the present application.

In an embodiment, as shown in FIG. 4, the driving integrated circuit 200 includes a plurality of driving circuits. An output end of each of the driving circuits is electrically connected to the shared thin-film transistors T3 of the subpixels 10 having the same color.

It should be explained that a same driving circuit driving the subpixels 10 having the same color can reduce a power of a load carried by the same driving circuit. This is beneficial to meet power supply requirements of different thin-film transistors and increases a driving capability of the shared thin-film transistors T3, thereby increasing a uniformity of displayed brightness.

In one of the embodiments, driving circuits include current amplifiers and follower amplifiers. An inverting input end of the current amplifier is connected to an output end of the current amplifier. A non-inverting input end of the follower amplifier is connected to the output end of the current amplifier. An inverting input end of the follower amplifier is connected to an output end of the follower amplifier and one of the source or the drain of the shared thin-film transistor T3.

It should be explained that, in this embodiment, the current amplifier is connected in series with the follower amplifier connected with negative feedback after it is connected with negative feedback. This can perform secondary current amplification on an access signal of the current amplifier and can achieve a current driving capability of up to 600 mA, which greatly improves the current driving capability of each of the driving circuits, thereby increasing the driving capability of the shared thin-film transistors T3 and further increasing the uniformity of the displayed brightness.

In an embodiment, the follower amplifier can be configured as a voltage amplifier and can perform secondary current amplification on an output signal of the current amplifier.

In an embodiment, each of the driving circuits further includes a digital-to-analog converter. An output end of the digital-to-analog converter is connected to a positive input end of the current amplifier.

In an embodiment, a power end of the current amplifier and a power end of the follower amplifier are configured to connect to a positive power signal VDDA, and a voltage reference end of the digital-to-analog converter is configured to connect to a reference voltage signal VREF. An electric potential of the reference voltage signal VREF is less than an electric potential of the positive power signal VDDA.

It should be explained that the positive power signal VDDA can provide a positive power for the current amplifier and follower amplifier, and meanwhile, a negative power signal can provide a negative power for the current amplifier and follower amplifier. The positive power signal VDDA and the negative power signal can form a DC power. The reference voltage signal VREF can be configured to limit a maximum output voltage of the digital-to-analog converter. For example, the maximum voltage that the digital-to-analog converter can output is the electric potential of the reference voltage signal VREF. If an accuracy of the digital-to-analog converter is 8 bits, the digital-to-analog converter can output 256 different voltage specifications, which can be divided into 256 equal parts of the maximum voltage.

It should be explained that the voltage reference end of the digital-to-analog converter, the current amplifier, and follower amplifier are separately powered to prevent a fluctuation of the electric potential of the positive power signal VDDA from affecting the output voltage of the digital-to-analog converter. Configuring the electric potential of the reference voltage signal VREF less than the electric potential of the positive power signal VDDA is beneficial to realize a high-precision output of the digital-to-analog converter.

In an embodiment, the electric potential of the positive power signal VDDA ranges from 15 volt (V) direct current to 18 V direct current. A difference between the electric potential of the positive power signal VDDA and the electric potential of the reference voltage signal VREF ranges from 0.3 V to 0.7 V.

It should be explained that configuring the difference between the electric potential of the positive power signal VDDA and the electric potential of the reference voltage signal VREF is beneficial to realize the high-precision output of the digital-to-analog converter.

In an embodiment, the difference between the electric potential of the positive power signal VDDA and the electric potential of the reference voltage signal VREF is 0.5 V.

It should be explained that specifically configuring the difference between the electric potential of the positive power signal VDDA and the electric potential of the reference voltage signal VREF to 0.5 is beneficial to further realize the high-precision output of the digital-to-analog converter.

In an embodiment, the driving integrated circuit 200 further includes a timing controller 270, a memory 280, and a bidirectional two-wire synchronous serial bus controller 290. An output end of the timing controller 270 is connected to an input end of the digital-to-analog converter. The memory 280 is connected to the timing controller 270 and is configured to store an output voltage parameter of the digital-to-analog converter. The bidirectional two-wire synchronous serial bus controller 290 is connected to the timing controller 270 and is configured to online adjust the output voltage of the digital-to-analog converter or write the output voltage parameter to the memory 280.

It should be explained that the bidirectional two-wire synchronous serial bus controller 290 further includes a write protect pin WP. A working mode of the bidirectional two-wire synchronous serial bus controller 290 can be correspondingly switched through an electric potential of the write protect pin WP. For example, when the electric potential of the write protect pin WP is at a low electric potential, the bidirectional two-wire synchronous serial bus controller 290 works in an online adjust mode; when the electric potential of write protect pin WP is at a high electric potential, the bidirectional two-wire synchronous serial bus controller 290 works in a write mode, and at this time, the output voltage parameter can be correspondingly written to the memory 280.

The bidirectional two-wire synchronous serial bus controller 290 may have an inter-integrated circuit (IIC) type input interface and an IIC type output interface. The IIC type output interface can be electrically connected to the timing controller 270. The IIC type input interface can be configured to connect external devices. It can be understood that the IIC interfaces can include a transmission line SCL and a transmission line SDL to achieve reception and transmission of signals.

It should be explained that the timing controller 270 can output a corresponding signal according to the output voltage parameter in the memory 280 to control a voltage and/or a current output by the driving circuits.

In an embodiment, the liquid crystal display panel 100 can include a red subpixel R, a green subpixel G, and a blue subpixel B. Correspondingly, the driving integrated circuit 200 can include a first driving circuit 210, a second driving circuit 220, and a third driving circuit 230. The timing controller 270 is electrically connected to the memory 280, the bidirectional two-wire synchronous serial bus controller 290, the first driving circuit 210, the second driving circuit 220, and the third driving circuit 230.

The first driving circuit 210 can supply power to all the red subpixels R in the liquid crystal display panel 100. The second driving circuit 220 can supply power to all the green subpixels G in the liquid crystal display panel 100. The third driving circuit 230 can supply power to all the blue subpixels B in the liquid crystal display panel 100.

As shown in FIG. 4, the first driving circuit 210 can include a first digital-to-analog converter DAC1, a first current amplifier OP1, and a first follower amplifier OP2. An input end of the first digital-to-analog converter DAC1 is connected to the timing controller 270. An output end of the first digital-to-analog converter DAC1 is connected to a positive input end of the first current amplifier OP1. An inverting input end of the first current amplifier OP1 is connected to an output end of the first current amplifier OP1 and a non-inverting input end of the first follower amplifier OP2. An inverting input end of the first follower amplifier OP2 is electrically connected to an output end of the first follower amplifier OP2 and the red subpixel R.

The second driving circuit 220 can include a second digital-to-analog converter DAC2, a second current amplifier OP3, and a second follower amplifier OP4. An input end of the second digital-to-analog converter DAC2 is connected to the timing controller 270. An output end of the second digital-to-analog converter DAC2 is connected to a positive input end of the second current amplifier OP3. An inverting input end of the second current amplifier OP3 is connected to the output end of the second current amplifier OP3 and a non-inverting input end of the second follower amplifier OP4. An inverting input end of the second follower amplifier OP4 is electrically connected to an output end of the second follower amplifier OP4 and the green subpixel G.

The third driving circuit 230 can include a third digital-to-analog converter DAC3, a third current amplifier OP5, and a third follower amplifier OP6. An input end of the third digital-to-analog converter DAC3 is connected to the timing controller 270. An output end of the third digital-to-analog converter DAC3 is connected to a positive input end of the third current amplifier OP5. An inverting input end of the third current amplifier OP5 is connected to an output end of the third current amplifier OP5 and a non-inverting input end of the third follower amplifier OP6. An inverting input end of the third follower amplifier OP6 is electrically connected to an output end of the third follower amplifier OP6 and the blue subpixel B.

The memory 280 can be, but is not limited to a non-volatile memory 280, and its stored content can be protected from power failure, which is suitable for a long-term storage.

In an embodiment, the liquid crystal display panel 100 can include at least two of the red subpixel R, the green subpixel G, or the blue subpixel B.

In an embodiment, the liquid crystal display panel 100 can include at least two of the red subpixel R, the green subpixel G, the blue subpixel B, or a white subpixel.

In an embodiment, the liquid crystal display panel 100 can include at least three of the red subpixel R, the green subpixel G, the blue subpixel B, or white subpixel.

It can be understood that, based on the above embodiments, the driving integrated circuit 200 can realize that a voltage and/or a current supplied to the subpixels 10 having different colors can be adjusted separately, and the adjustment range of the voltage and/or the current is increased. This has an obvious effect on a viewing angle optimization of large-size, high-resolution, and high-refresh rate liquid crystal display products.

In an embodiment, the present application provides an electronic device including the display device in any of the above embodiments.

It can be understood that the electronic device provided by this embodiment can reduce a power of a load carried by a same power supply loop by supplying different powers to the shared thin-film transistors T3 of the subpixels 10 having different colors through different output ends of the driving integrated circuit 200. This meets power supply requirements of different thin-film transistors and increases a driving capability of the shared thin-film transistors T3, thereby increasing a uniformity of displayed brightness. Meanwhile, the subpixels 10 having different colors are driven by different power supply loops, which helps to relieve a color shift caused by viewing angle deviation, thereby increasing an optimization effect of different viewing angles.

It can be understood that those having ordinary skills of the art may easily contemplate various changes and modifications of the technical solution and technical ideas of the present application and all these changes and modifications are considered within the protection scope of right for the present application.

What is claimed is:

1. A display device, comprising:

a liquid crystal display panel comprising subpixels having a plurality of colors, wherein each of the subpixels comprises a shared thin-film transistor; and a driving integrated circuit, wherein an output end of the driving integrated circuit is electrically connected to the shared thin-film transistors of the subpixels having a same color, and the output end of the driving integrated circuit is electrically connected to one of a source or a drain of the shared thin-film transistor, wherein the driving integrated circuit comprises a plurality of driving circuits, and an output end of each of the driving circuits is electrically connected to the shared thin-film transistors of the subpixels having the same color, wherein each of the driving circuits comprises:

a current amplifier, wherein an inverting input end of the current amplifier is connected to an output end of the current amplifier;

a follower amplifier, wherein a non-inverting input end of the follower amplifier is connected to the output end of the current amplifier, and an inverting input end of the follower amplifier is connected to an output end of the follower amplifier and one of the source or the drain of the shared thin-film transistor; and a digital-to-analog converter, and an output end of the digital-to-analog converter is connected to a positive input end of the current amplifier, and wherein a power end of the current amplifier and a power end of the follower amplifier are configured to connect to a positive power signal; and a voltage reference end of the digital-to-analog converter is configured to connect to a reference voltage signal, and an electric potential of the reference voltage signal is less than an electric potential of the positive power signal.

2. The display device according to claim 1, wherein the electric potential of the positive power signal ranges from 15 volt (V) direct current to 18 V direct current, and a difference between the electric potential of the positive power signal and the electric potential of the reference voltage signal ranges from 0.3 V to 0.7 V.

3. The display device according to claim 2, wherein the difference between the electric potential of the positive power signal and the electric potential of the reference voltage signal is 0.5 V.

4. The display device according to claim 1, wherein the driving integrated circuit further comprises:

a timing controller, wherein an output end of the timing controller is connected to an input end of the digital-to-analog converter;

a memory connected to the timing controller and configured to store an output voltage parameter of the digital-to-analog converter; and a bidirectional two-wire synchronous serial bus controller connected to the timing controller and configured to online adjust an output voltage of the digital-to-analog converter or write the output voltage parameter to the memory.

5. The display device according to claim 1, further comprising:

a plurality of data lines, wherein each of the data lines is electrically connected to a column of the subpixels; and a plurality of scan lines, wherein each of the scan lines is electrically connected to a row of the subpixels.

6. The display device according to claim 1, wherein the shared thin-film transistor is an amorphous silicon thin-film transistor.

7. The display device according to claim 1, wherein the shared thin-film transistor is an indium gallium zinc oxide thin-film transistor.

8. An electronic device, comprising a display device, wherein the display device comprises:

a liquid crystal display panel comprising subpixels having a plurality of colors, wherein each of the subpixels comprises a shared thin-film transistor; and a driving integrated circuit, wherein an output end of the driving integrated circuit is electrically connected to the shared thin-film transistors of the subpixels having a same color, and the output end of the driving integrated circuit is electrically connected to one of a source or a drain of the shared thin-film transistor, wherein the driving integrated circuit comprises a plurality of driving circuits, and an output end of each of the driving circuits is electrically connected to the shared thin-film transistors of the subpixels having the same color, wherein each of the driving circuits comprises:

a current amplifier, wherein an inverting input end of the current amplifier is connected to an output end of the current amplifier;

a follower amplifier, wherein a non-inverting input end of the follower amplifier is connected to the output end of the current amplifier, and an inverting input end of the follower amplifier is connected to an output end of the follower amplifier and one of the source or the drain of the shared thin-film transistor; and a digital-to-analog converter, and an output end of the digital-to-analog converter is connected to a positive input end of the current amplifier, and wherein a power end of the current amplifier and a power end of the follower amplifier are configured to connect to a positive power signal; and a voltage reference end of the digital-to-analog converter is configured to connect to a reference voltage signal, and an electric potential of the reference voltage signal is less than an electric potential of the positive power signal.

9. The electronic device according to claim 8, wherein the electric potential of the positive power signal ranges from 15 volt (V) direct current to 18 V direct current, and a difference between the electric potential of the positive power signal and the electric potential of the reference voltage signal ranges from 0.3 V to 0.7 V.

10. The electronic device according to claim 9, wherein the difference between the electric potential of the positive power signal and the electric potential of the reference voltage signal is 0.5 V.

11. The electronic device according to claim 8, wherein the driving integrated circuit further comprises:

a timing controller, wherein an output end of the timing controller is connected to an input end of the digital-to-analog converter;

a memory connected to the timing controller and configured to store an output voltage parameter of the digital-to-analog converter; and a bidirectional two-wire synchronous serial bus controller connected to the timing controller and configured to online adjust an output voltage of the digital-to-analog converter or write the output voltage parameter to the memory.

12. The electronic device according to claim 8, wherein the display device further comprises:

a plurality of data lines, wherein each of the data lines is electrically connected to a column of the subpixels; and a plurality of scan lines, wherein each of the scan lines is electrically connected to a row of the subpixels.

* * * * *